(12) United States Patent
Pamuru et al.

(10) Patent No.: US 12,229,462 B2
(45) Date of Patent: Feb. 18, 2025

(54) SYSTEM AND METHOD FOR AUTOMATICALLY CURATING AND DISPLAYING IMAGES

(71) Applicants: Sudheer Kumar Pamuru, Frisco, TX (US); Madhukiran Dandamudi, Frisco, TX (US); Vineel Kurma, Frisco, TX (US)

(72) Inventors: Sudheer Kumar Pamuru, Frisco, TX (US); Madhukiran Dandamudi, Frisco, TX (US); Vineel Kurma, Frisco, TX (US)

(73) Assignee: Freddy Technologies LLC, Chicago, IL (US)

( * ) Notice: Subject to any disclaimer, the term of this patent is extended or adjusted under 35 U.S.C. 154(b) by 0 days.

(21) Appl. No.: 18/132,669

(22) Filed: Apr. 10, 2023

(65) Prior Publication Data

US 2023/0315373 A1 Oct. 5, 2023

Related U.S. Application Data

(63) Continuation-in-part of application No. 17/683,032, filed on Feb. 28, 2022, now Pat. No. 11,861,665.

(51) Int. Cl.
*G06V 20/62* (2022.01)
*G06F 3/14* (2006.01)
(Continued)

(52) U.S. Cl.
CPC ............... *G06F 3/14* (2013.01); *G06T 7/194* (2017.01); *G06V 10/44* (2022.01); *G06V 10/60* (2022.01);
(Continued)

(58) Field of Classification Search
CPC .... G06V 10/764; G06V 10/17; G06V 30/413; G06T 11/60; G06T 7/75; G06T 19/006
See application file for complete search history.

(56) References Cited

U.S. PATENT DOCUMENTS 5,852,672 A   12/1998  Lu
6,134,564 A   10/2000  Listou
(Continued)

FOREIGN PATENT DOCUMENTS

KR    20190060817 A    6/2019
WO    2000062542 A1   10/2000
WO    2001903199 A1   12/2001

OTHER PUBLICATIONS

Asuka Yagi, Masataka Imura, Yoshiro Kuroda, and Osamu Oshiro; "360-Degree Fog Projection Interactive Display"; SIGGRAPH Asia 2011; Dec. 12-15, 2011; Hong Kong, China; ISBN 978-1-4503-0807-6/11/0012.

(Continued)

*Primary Examiner* — Saba Dagnew
(74) *Attorney, Agent, or Firm* — Brett J. Trout

(57) ABSTRACT

The present disclosure is directed to automatically curating a set of images according to a predetermined set of compliance rules and displaying those images. The machine learning and artificial intelligence technology can differentiate between images and identify features within images. The features may include a desired perspective, inconsistent backgrounds, low detail, blurriness, shadows, glare, reflections, unwanted information, unwanted elements, poles, trees, lack or focus, poor resolution, rain, snow, fumes, smoke, mud, unwanted banners, unwanted overlays, etc.
The technology is trained to identify these features in the images and automatically tag the images with information relating to the features. A user selects a set of predetermined rules to be applied to the images. The technology then uses (Continued)

the tags to apply these selected rules to the images to modify the images and display the modified images in a predetermined sequence and arrangement.

13 Claims, 16 Drawing Sheets

(51) Int. Cl.
*G06T 7/194* (2017.01)
*G06V 10/44* (2022.01)
*G06V 10/60* (2022.01)

(52) U.S. Cl.
CPC .. *G06V 20/625* (2022.01); *G06T 2207/30252* (2013.01); *G06V 2201/07* (2022.01)

(56) References Cited

U.S. PATENT DOCUMENTS

| | | | |
|---|---|---|---|
| 6,795,113 | B1 | 9/2004 | Jackson et al. |
| 6,965,324 | B1 | 11/2005 | Suggs, Sr. |
| 7,106,348 | B2 | 9/2006 | Matsumoto et al. |
| 7,149,367 | B2 | 12/2006 | Cutler |
| 7,567,274 | B2 | 7/2009 | Ekpar |
| 7,882,258 | B1 | 2/2011 | Sumler et al. |
| 8,353,406 | B2 | 1/2013 | Sumler et al. |
| 8,503,826 | B2 | 8/2013 | Klimenko |
| 8,913,847 | B2 | 12/2014 | Tang et al. |
| 9,443,153 | B1 | 9/2016 | Gupta et al. |
| 9,619,104 | B2 | 4/2017 | Xin et al. |
| 9,865,069 | B1 | 1/2018 | Saporta et al. |
| 9,986,154 | B2 | 5/2018 | Chen et al. |
| 10,078,892 | B1 | 9/2018 | Wang et al. |
| 10,140,553 | B1 | 11/2018 | Vasisht et al. |
| 10,332,295 | B1 | 6/2019 | Saporta et al. |
| 10,672,106 | B1 | 6/2020 | Saporta et al. |
| 10,672,169 | B2 | 6/2020 | Saporta et al. |
| 10,719,939 | B2 | 7/2020 | Holzer et al. |
| 10,853,985 | B2 | 12/2020 | Saporta et al. |
| 2002/0018076 | A1 | 2/2002 | Gianola |
| 2002/0063714 | A1 | 5/2002 | Haas et al. |
| 2002/0085219 | A1 | 7/2002 | Ramamoorthy |
| 2003/0030636 | A1 | 2/2003 | Yamaoka |
| 2003/0103065 | A1 | 6/2003 | Masera et al. |
| 2009/0112687 | A1 | 4/2009 | Blair et al. |
| 2011/0052062 | A1* | 3/2011 | Chiu .................. G06V 30/413 382/176 |
| 2012/0041722 | A1 | 2/2012 | Quan et al. |
| 2012/0293632 | A1 | 11/2012 | Yukich |
| 2013/0016181 | A1 | 1/2013 | Penner |
| 2013/0243351 | A1 | 9/2013 | Feng et al. |
| 2014/0010412 | A1 | 1/2014 | Price |
| 2014/0035947 | A1 | 2/2014 | Kramer et al. |
| 2014/0132594 | A1 | 5/2014 | Gharpure et al. |
| 2014/0152806 | A1 | 6/2014 | Hauk |
| 2015/0154798 | A1 | 6/2015 | Simpson et al. |
| 2015/0302633 | A1 | 10/2015 | Li et al. |
| 2015/0325038 | A1 | 11/2015 | Baker |
| 2015/0325048 | A1 | 11/2015 | Engle et al. |
| 2017/0199898 | A1* | 7/2017 | Shen .................. G06F 18/24137 |
| 2018/0012330 | A1 | 1/2018 | Holzer et al. |
| 2018/0165502 | A1* | 6/2018 | Mianzo ..................... G06T 7/75 |
| 2018/0260793 | A1 | 9/2018 | Li et al. |
| 2018/0293664 | A1 | 10/2018 | Zhang et al. |
| 2019/0236371 | A1* | 8/2019 | Boonmee ............. G06V 10/764 |
| 2019/0279044 | A1* | 9/2019 | Vasisht .................. G06V 10/17 |
| 2019/0370587 | A1* | 12/2019 | Burachas ................ G06T 11/60 |
| 2022/0189124 | A1* | 6/2022 | Sanor .................... G06T 19/006 |

OTHER PUBLICATIONS

Matthew McGinity, Jeffrey Shaw, Volker Kuchelmeister, Ardrian Hardjono, and Dennis Del Favero; "Avie: A Versatile Multi-User Stereo 360° Interactive VR Theatre"; EDT 2007; Aug. 4, 2007; San Diego, California; ISBN 978-1-59593-669-1/07/0008.

Tina T. Zhou, Tom Gedeon, and Jess S. Jin; "Automatic Generating Detail-on-Demand Hypervideo Using MPEG-7 and Smil"; MM'05; Nov. 6-11, 2005; Singapore; ISBN 1-59593-044-2/05/0011.

Petre Stroica and Marian Vladescu; "Implementation of an omnidirectional surveillance system based on 360-degree panoramic vision"; Advanced Topics in Optoelectronics, Microelectronics, and Nanotechnologies VI; Proc. of SPIE vol. 8411, 84111Y.

https://www.webrotate360.com/products/webrotate-360-product-viewer/version-history.aspx. Published prior to Nov. 2020.

https://www.dopeless-design.de/dopeless-rotate-jquery-plugin-360-degrees-product-viewer.html. Published prior to Nov. 2020.

https://github.com/pisi/Reel/blob/master/README.markdown. Published prior to Nov. 2020.

https://www.magictoolbox.com/magic360/. Published prior to Nov. 2020.

https://sirv.com/demos/demo-hotspot-on-360-spin/. Published prior to Nov. 2020.

https://www.ajax-zoom.com/. Published prior to Nov. 2020.

http://www.ajax-zoom.com/examples/example33.php. Published prior to Nov. 2020.

http://reel360.org/reel. Published prior to Nov. 2020.

https://www.ajax-zoom.com/index.php?cid=docs. Published prior to Nov. 2020.

https://www.webrotate360.com/examples/browse-all-examples/buoyancy-compensator.aspx. Published prior to Nov. 2020.

https://www.webrotate360.com/examples/browse-all-examples/360-car-photography.aspx. Published prior to Nov. 2020.

* cited by examiner

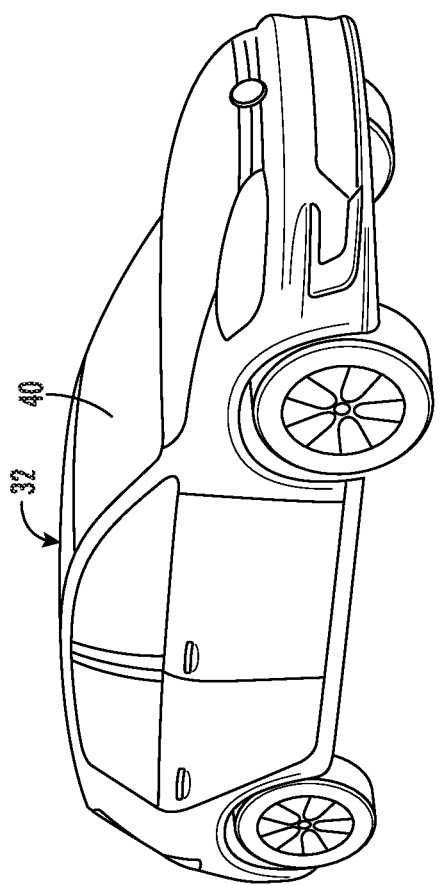
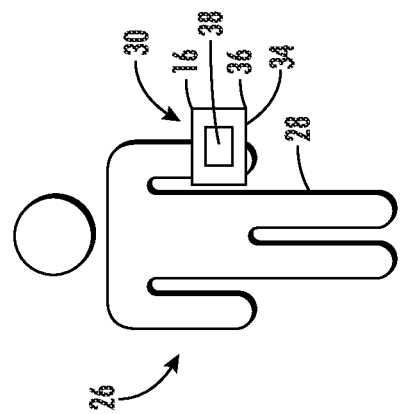
FIG. 2

FEATURE LIST

86 — side view background
side view
front view
rear view
blurry
low resolution
glare
shadow
banner
bad background
lack of detail —76
dirty engine bay
worn interior
folded seats
image blur
glare
warning lights,
vehicle out of position
smudges
weather
fumes

COMPLIANCE RULES only use die perspective view
remove glare
segment background
add blue background
134 —— remove existing banners
add banner with year make and model
blur license plate
upscale image
present images on webage in 6x6 grid
— 132

FIG. 9

SYSTEM AND METHOD FOR AUTOMATICALLY CURATING AND DISPLAYING IMAGES

TECHNICAL FIELD

The following disclosure relates generally to a machine learning artificial intelligence system for identifying and tagging features in an image, applying a set of rules to the tags, and automatically displaying a portion of the image according to the rules and, more particularly, automatically applying a set of compliance rules to a plurality of images and automatically displaying the images in conformance with the compliance rules.

BACKGROUND

The present invention relates to an improvement on the systems and methods described in U.S. Pat. No. 11,488,371 to Pamuru and U.S. patent application Ser. No. 17/683,032 filed Feb. 28, 2022 that are both incorporated herein by this reference. When selling unique products, such as vehicles, online sellers often use images to allow potential purchasers to view the product. To streamline the online shopping experience, sellers often desire the images to be uniform to assist potential purchasers in comparing products to one another. Different sellers may have different guidelines for how they desire images to be presented, but for a particular seller, it is often desirable to have all images on a webpage comport to a preselected set of guidelines for displaying such images. Sellers can use their own cameras to capture videos or multiple images of an object for online display. While this solution avoids the necessity of costly professional equipment, the manual processes of using image manipulation tools to eliminate unwanted elements in the resulting images, to comport with the seller's desired presentation guidelines, can be time-consuming, expensive, and result in suboptimal uniformity in the final display of the images. Unfortunately, many of the images sellers have of their products are not uniform. This lack of uniformity may be attributable to inconsistent backgrounds, low detail, blurriness, poor perspective, shadows, glare, reflections, unwanted information, such as a license plate number, etc. Modifying these images to comport with the user's desired image presentation guidelines often requires complex software, and time-consuming and expensive human expertise in the field of digital image manipulation.

Users such as product sellers can use various types of software on devices, such as mobile phones, to modify the images of their products to comport with a desired set of presentation guidelines. One drawback associated with using this software to comport images to desired image display protocols is that modifying large numbers of images, images with multiple compliance issues, and images of sellers with multiple presentation guidelines can be costly and time-consuming and may result in less than optimal and/or inconsistent final image quality. It would be desirable to automate the process for modifying and displaying uniform images comporting with a pre-determined set of presentation guidelines.

While sellers can manually manipulate images to remove unwanted additional inventory, poles, trees, etc. in the background of an image, it would be desirable to automate the process and to add and remove additional presentation guidelines for different products and different target audiences. For images that lack focus or resolution, there exist in the art systems that sellers may use to sharpen and/or upscale images, but such systems require at least some knowledge and expertise on the part of the seller to implement such systems. Even with such knowledge and expertise, identifying, sharpening, and upscaling a large number of images is time-consuming. It would therefore be desirable to provide a system that allows a seller to automatically identify guidelines for images which a system automatically applies to a group of images to automatically sharpen and/or upscale as desired by the seller. It would also be desirable to allow a seller to select guidelines for images that a system automatically applies to a group of images to automatically identify and remove noise and undesirable artifacts such as fingerprints or smudges on the product, glare, reflections, etc.

Certain sellers may desire a group of displayed product images all show the same perspective of the product offerings. While initially capturing all of the images from the desired perspective addresses this issue, sometimes a seller receives videos, or images from multiple sources that may include multiple images taken from a plurality of perspectives. It would therefore be desirable to provide a system that allows a seller to automatically select guidelines for images that the system automatically applies to a group of images to automatically sort into images showing product from a predetermined perspective.

While systems exist to remove undesirable elements from images, such as rain, snow, fumes, smoke, and/or mud and noise in the background like trees, humans, or more cars, training these systems for particular products and elements selected by the seller, such systems often require the seller to have a knowledge and expertise associated with removing these undesirable elements from images. It would be desirable to provide a system that allows a seller to automatically identify guidelines for the display of images that the system automatically applies to a group of images to remove undesired elements selected by the seller.

Sellers use banners and overlays provided on images to provide potential buyers with information about the product displayed in the image. Sometimes images contain improperly cropped overlays or banners that a seller desires to modify or remove. It would be desirable to provide a system that allows a seller to automatically identify guidelines for images that the system automatically applies to a group of images to modify or remove overlays and/or banners as selected by the seller.

The present invention uses a machine learning artificial intelligence system to automatically tag all of the foregoing features in a group of images and allows a seller to select which of the tagged features the seller wishes the system to modify and in what manner to display the images in compliance with the seller's selected guidelines. This increases uniformity, saves time, and improves the quality of the displayed images to enhance the overall potential customer experience.

SUMMARY OF THE DISCLOSED SUBJECT MATTER

The system and method of the present disclosure is directed to automatically curating and modifying a set of images according to a predetermined set of rules and displaying those images. The machine learning and artificial intelligence technology associated with the system and method can differentiate between images and identify features within images. Such features may include a desired perspective, inconsistent backgrounds, low detail, blurriness, shadows, glare, reflections, unwanted information, unwanted elements, poles, trees, lack or focus, poor resolution, rain, snow, fumes, smoke, mud, unwanted banners, unwanted overlays, etc.

The technology is trained to identify these features in the images and automatically tag the images with information relating to the features. A user selects a set of predetermined rules to be applied to the images. By way of example, the user may select a rule that the resulting displayed images should all have a blue background and show an object in the images from a side perspective. The technology then uses the tags to apply these selected rules to the images. The technology automatically identifies the images showing the object in the image from the side perspective and removes the background from those images, replacing the background with a blue background. At least one aspect of the present disclosure is directed to using technology to use the tags to apply the rules to the images and display the resulting images on a website or in some other visually perceptive medium.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in, and constitute a part of, this specification.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 2 is a perspective view of a user capturing object images and/or videos, in accordance with one or more aspects of the present disclosure.

FIG. 6 is a list of features to be identified by machine learning and artificial intelligence in captured images of an object, in accordance with one or more aspects of the present disclosure.

FIG. 9 is a list of compliance rules for implementation in accordance with one or more aspects of the present disclosure.

DESCRIPTION OF EMBODIMENTS

Figure 1:
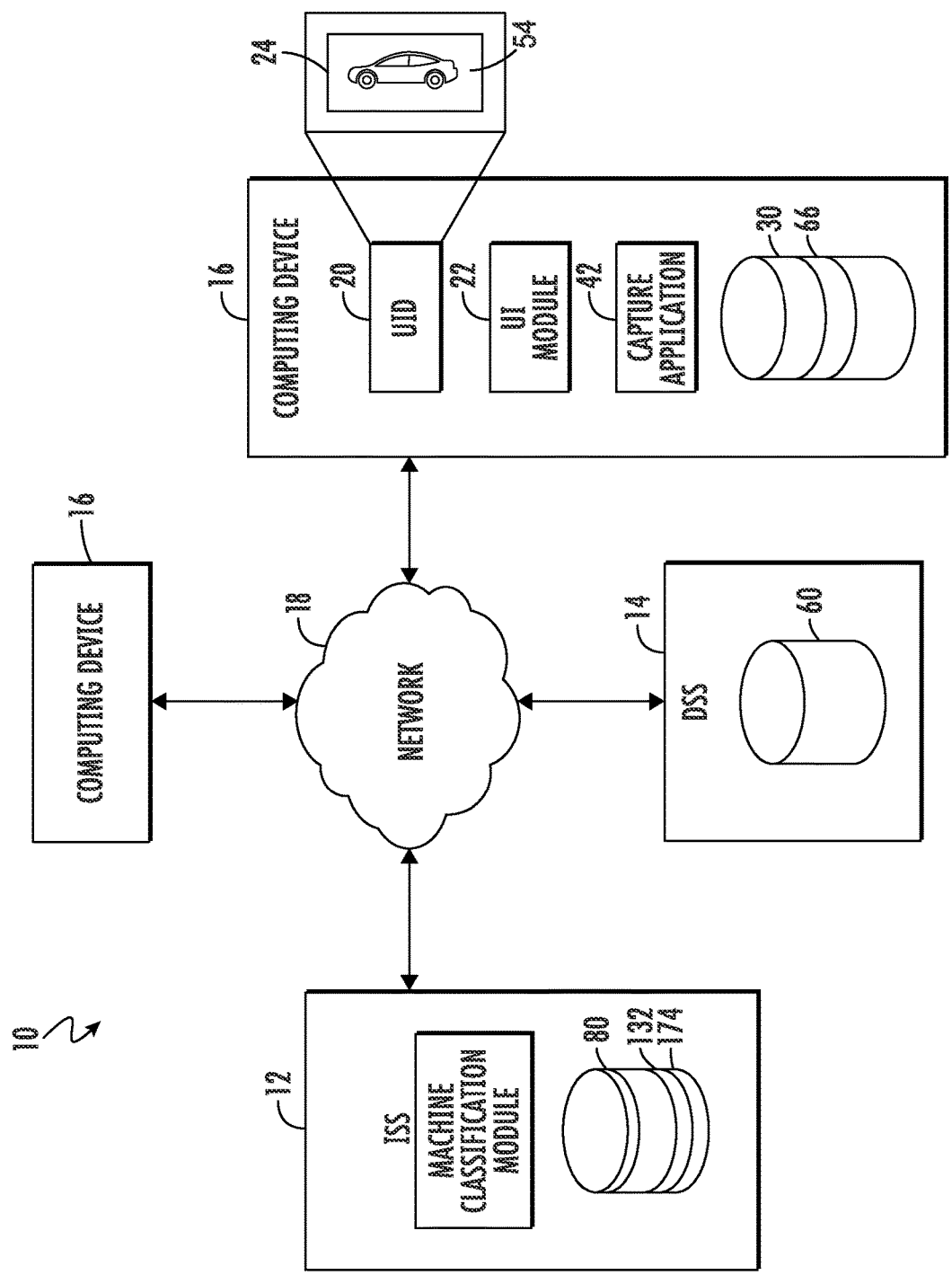
FIG. 1 is a conceptual diagram illustrating an example system for generating a display of images in accordance with predetermined compliance rules, in accordance with one or more aspects of the present disclosure.

In general, techniques of this disclosure may enable a computing device to access multiple images of different objects. A computing system associated with the computing device may analyze contextual information associated with the images and identify predetermined features in the images. The system digitally "tags" the images with information associated with the identified features by associating a piece of software code with the image. The system compares these tags to a predetermined list of rules governing how to address various features in the images. The system uses the tags to apply the appropriate rules to the images, based on the features identified in the images, to create modified images that the system displays.

For example, an automobile dealer may receive a plurality of images of vehicles for sale. The images may include images of the vehicles taken from various perspectives, with different backgrounds, and identifiable license plate numbers. The dealer, on its own, or to comport with third-party compliance rules, such as a vehicle manufacturer, may wish to display only those images of vehicles taken from a front perspective view, replace the existing backgrounds with a blue background, and blur the characters on the license plate. The dealer, or a third-party, may upload the images over the internet to a computer having a software system installed that examines the images for a predetermined list of features. The system tags the images with identified features, uses the tags to apply a list of predetermined rules to the images, and then display the images on the dealer's website or another desired location. If desired, the dealer may apply this same process to manipulate and display videos, rather than images.

Techniques of this disclosure use machine learning artificial intelligence, such as that known in the art, to identify and tag a list of predetermined features in an image. The artificial intelligence aspect of the system improves the feature identification accuracy, and tag processing time, by generating a feature identification function using specific training data sets. If desired, the feature identification function may be a convolutional neural network (CNN). The feature identification function preferably identifies features from images such as vehicle make, vehicle model, vehicle angles, vehicle features, vehicle year, vehicle trim, image perspective, banners, text, incorrect cropping, background segmentation, level of image detail, shadows, glare, reflections, unwanted information such as license plate numbers, unwanted elements such as people, animals, trees, or other vehicles, lack or focus, poor resolution, rain, fumes, snow, dust, smoke, mud, unwanted or obtrusive banners or overlays, etc.

The machine learning artificial intelligence system may also improve the accuracy of feature detection by generating a training data set with a high relevance. To overcome lack of uniformity from images received for identification, the training data sets used by the identification system may include images that are modified to account for variations from images taken with mobile devices. The identification system may also be automatically updated as new images become available, vehicle information changes, and/or new images become available from a web scraper used to collect new images from online or other bulk sources. As information in online resources changes, the identification system may recalculate the feature identification function to improve results.

A novel feature of the machine learning artificial intelligence component of the system examines the images and tags the images with a list of predetermined features found in the images. The machine learning artificial intelligence component of the system then compares the tags against a list of compliance rules to select images for display. If the images are out of compliance with the rules, the machine learning artificial intelligence component of the system then automatically modifies or removes the images to place them in compliance with the rules and displays the modified images on a webpage or in any other desired format. As the system examines images associated with the object, the machine learning component of the system may continuously update itself to better identify features in the images for future compliance processing.

The system may also be provided with data associated with various features in the image. The machine learning artificial intelligence component of the system scans the images to identify and locate the features in the images. As used in this context, machine learning artificial intelligence refers to computer-aided supervised learning that uses complex mathematical formalisms to make inference-based assumptions to improve the accuracy of the mapping of inputs to outputs using one or more general rules. The system automatically adds or modifies a feature in images that are not in conformance with the compliance rules. For example, if the tag on the image indicates that the image is of the rear of the vehicle when the compliance rules mandate a front view, the system automatically rejects the image for modification or display and, if no suitable image can be located, sends an alert to the user that the desired image is missing. In another example, if the system locates an image of a front view of the vehicle, but the system has tagged the image as having additional vehicles in the background, if the compliance rules mandate another background, the system can modify the image. Depending on the particular compliance rules, the system may leave the background blank, may automatically insert a solid color background, or may insert a detailed background such as a dealership backdrop. The system automatically uses the background tag to segment the image to remove the background from the image and replace the background with a desired new background. As the system examines images associated with the object, which in this case is a vehicle, the machine learning component of the system may continuously update itself to better locate features in the images that the system is capable of modifying. Whereas the system may not initially have the capability of modifying a feature of the image, for instance adjusting a side perspective view to a three-quarters front perspective view, with additional iterations and training on more images the system may eventually use machine learning artificial intelligence to modify the perspective of the image to the point where the image comports with the compliance rules.

Throughout the disclosure, examples are described where a computing device and/or a computing system analyzes images associated with an object to automatically identify features in the images, tag the images based on the features, and use those tags to modify and display the images. For example, a vehicle dealer wishing to create a standardized webpage of vehicles for sale may walk around the inventory lot taking pictures and/or videos of various vehicles with a mobile device. The dealer then sends the images and/or videos to the system that may be a cloud application, an application on the dealer's mobile device, etc. The system then automatically analyzes the images or extracted images from the videos to automatically use machine learning artificial intelligence to tag the features within the images and use those tags to identify images for display on the webpage. The system may also automatically identify vehicle features within the images, and tag those images with interactive hotspots providing additional information relating to the vehicle feature information such as alloy rims. The system may also use the tag to automatically place a banner across the image indicating that the vehicle has alloy rims. Once the system has selected and modified all of the images in accordance with the compliance rules, the system automatically displays the images on a webpage, or other location, in accordance with predetermined display protocols provided the system. Alternatively, the system can use machine learning artificial intelligence to train itself on image placement and use that training to position the images on the website in a preferable arrangement.

Exemplary Systems

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first image could be termed a second image, and, similarly, a second image could be termed a first image, without departing from the scope of the present invention. The first image and the second image are both images, but they are not the same image.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as application and other smart phone functions. Exemplary embodiments of portable multifunction devices include, without limitation, the iPhone®, and iPad® devices from Apple Inc. of Cupertino, Calif. Other portable electronic devices, such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, stylus, a mouse and/or a joystick.

The device typically supports a variety of applications, such as one or more of the following: a telephone application, an e-mail application, an instant messaging application, a digital image management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of the system and method for automatically curating and displaying images. FIG. 1 is a conceptual diagram illustrating system 10 as an example system for automatically examining images, tagging features in the images, placing the images in compliance with a pre-determined ruleset, and publishing the resulting images, in accordance with one or more aspects of the present disclosure. System 10 includes at least one non-transitory computer-readable storage medium having computer-executable instructions stored thereon which, when executed by a computer, causes the computer to perform the method described below. The system 10 preferably has a information server system ("ISS") 12 in communication, via network 18, with dealer server system ("DSS") 14 and computing device 16. Although system 10 is shown as being distributed amongst ISS 12, DSS 14, and computing device 16, in other examples, the features and techniques attributed to system 10 may be performed internally, by local components of computing device 16.

Similarly, ISS 12 may include certain components and perform various techniques that are otherwise attributed in the below description to DSS 14 and computing device 16.

Network 18 represents any public or private communications network, for instance, cellular, Wi-Fi, and/or other types of networks, for transmitting data between computing systems, servers, and computing devices. ISS 12 may communicate, via network 18, with computing device 16 to receive images from the computing device 16. Similarly, ISS 12 may communicate, via network 18, with DSS 14 to receive data associated with objects (such as vehicles) depicted in images received from computing device 16.

Network 18 may include one or more network hubs, network switches, network routers, or any other network equipment, that are operatively inter-coupled thereby providing for the exchange of information between ISS 12, DSS 14, and computing device 16. Computing device 16, ISS 12, and DSS 14 may transmit and receive data across network 18 using any suitable communication techniques. ISS 12, DSS 14, and computing device 16 may each be operatively coupled to network 18 using respective network links. The links coupling computing device 16, ISS 12, and DSS 14 to network 18 may be Ethernet or other types of network connections and such connections may be wireless and/or wired connections.

Computing device 16 represents an individual mobile or non-mobile computing device. Examples of computing device 16 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant), a personal digital assistants (PDA), portable gaming systems, media players, e-book readers, mobile television platforms, automobile navigation and entertainment systems, or any other types of mobile, non-mobile, wearable, and non-wearable computing devices configured to receive information via a network, such as network 18. Computing device 16 includes user interface device (UID) 20 and user interface (UI) module 22. Module 22 may perform operations described using software, hardware, firmware, or a mixture of hardware, software, and firmware residing in and/or executing at respective computing device 16. Computing device 16 may execute module 22 with multiple processors or multiple devices. Computing device 16 may execute module 22 as virtual machines executing on underlying hardware. Module 22 may execute as one or more services of an operating system or computing platform. Module 22 may execute as one or more executable programs at an application layer of a computing platform.

UID 20 of computing device 16 may function as an input and/or output device for computing device 16. UID 20 may be implemented using various technologies. For instance, UID 20 may function as an input device using presence-sensitive input screens, such as resistive touchscreens, surface acoustic wave touchscreens, capacitive touchscreens, projective capacitance touchscreens, presence-sensitive screens, acoustic pulse recognition touchscreens, or another presence-sensitive display technology. In addition, UID 20 may include microphone technologies, infrared sensor technologies, or other input device technology for use in receiving user input.

UID 20 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 16. In addition, UID 20 may include speaker technologies, haptic feedback technologies, or other output device technology for use in outputting information to a user.

UID 20 may include a presence-sensitive display that may receive tactile input from a user of computing device 16. UID 20 may receive indications of tactile input by detecting one or more gestures from a user (e.g., the user touching or pointing to one or more locations of UID 20 with a finger or a stylus pen). UID 20 may present output to a user, for instance at a presence-sensitive display. UID 20 may present the output as a graphical user interface (e.g., user interface 24), which may be associated with functionality provided by computing device 16 and/or a service being accessed by computing device 16.

For example, UID 20 may present a user interface (e.g., user interface 24) related to uploading images to ISS 12 which UI module 22 accesses from ISS 12 on behalf of computing device 16. In some examples, UID 20 may present a user interface related to image collection and distribution functions provided by UI module 22 or other features of computing platforms, operating systems, applications, and/or services executing at or accessible from computing device 16 (e.g., electronic message applications, Internet browser applications, mobile or desktop operating systems, etc.).

UI module 22 may manage user interactions with UID 20 and other components of computing device 16 including interacting with ISS 12 so as to provide image feature identification and image modification results at UID 20. UI module 22 may cause UID 20 to output a user interface, such as user interface 24 (or other example user interfaces) for display, as a user of computing device 16 views output and/or provides input at UID 20. UI module 22 and UID 20 may interpret inputs detected at UID 20 and may relay information about the inputs detected at UID 20 to one or more associated platforms, operating systems, applications, and/or services executing at computing device 16, for example, to cause computing device 16 to perform functions.

UI module 22 may receive information and instructions from one or more associated platforms, operating systems, applications, and/or services executing at computing device 16 and/or one or more remote computing systems, such as ISS 12 and DSS 14. In addition, UI module 22 may act as an intermediary between the one or more associated platforms, operating systems, applications, and/or services executing at computing device 16, and various output devices of computing device 16 (e.g., speakers, LED indicators, audio or electrostatic haptic output device, etc.) to produce output (e.g., a graphic, a flash of light, a sound, a haptic response, etc.) with computing device 16.

In the example of FIG. 1, user interface 24 is a graphical user interface associated with a customer assistance service provided by ISS 12 and accessed by computing device 16. As shown in FIG. 1, user interface 24 presents "image capture" from ISS 12 to aid a user in capturing images to curate and display in accordance with predetermined rules. User interface 24 may present product information in various forms such as text, graphics, content cards, images, etc. UI module 22 may cause UID 20 to output user interface 24 based on data UI module 22 receives via network 18 from ISS 12. UI module 22 may receive graphical information (e.g., text data, images data, etc.) for presenting user interface 24 as input from ISS 12 along with instructions from ISS 12 for presenting the graphical information within user interface 24 at UID 20.

Figure 3:
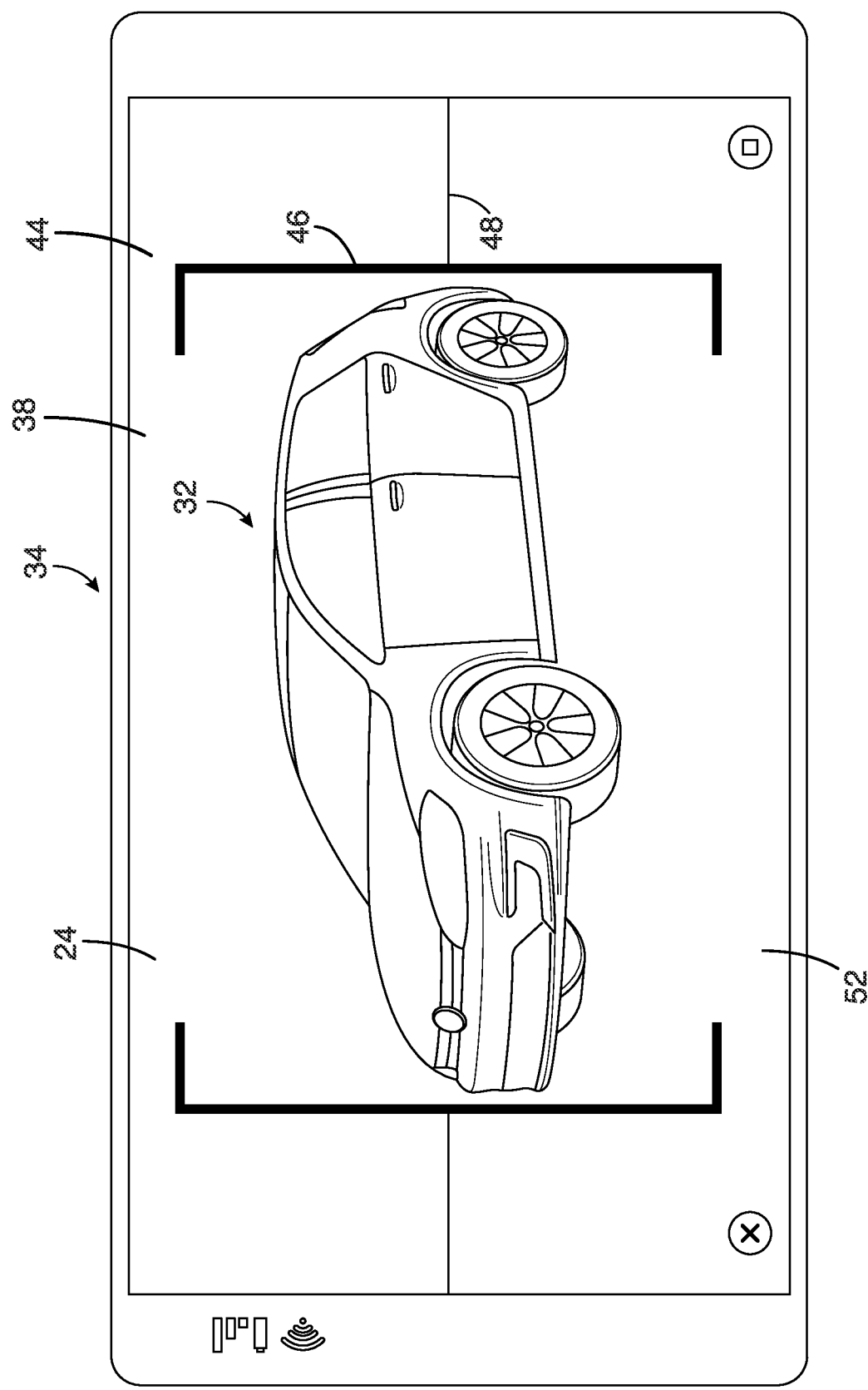
FIG. 3 is a conceptual diagram illustrating an example graphical user interface presented by an example computing device that is configured to capture object images and/or videos at a physical location, in accordance with one or more aspects of the present disclosure.

FIG. 2 is a perspective view of a user 26, in this embodiment a vehicle dealer 28, using computing device 16 to capture images 30 by taking multiple pictures of an item, such as an object 32. In this embodiment, computing device 16 is a mobile phone 34 having a camera 36 and display 38, and the object 32 is a vehicle 40. When dealer 28 wishes to use system 10 to display images in accordance with predetermined compliance rules, dealer 28 launches a downloaded application 42 running locally on computing device 16. FIGS. 1-3. As shown in FIG. 3, when dealer 28 launches application 42, display 38 of computing device 16 displays an image capture screen 44. As shown in FIG. 3, when dealer 28 focuses computing device 16 to capture an image 30, system 10 presents, on display 38 associated with computing device 16, the user interface 24.

User interface 24 provides multiple aids to assist dealer 28 in optimizing image capture to facilitate system 10 displaying images in compliance with a set of pre-determined rules. User interface 24 preferably automatically indicates to the dealer 28 the images and perspectives desired for display. Two such aids are target brackets 46 and level lines 48 that indicate to dealer 22 where to position vehicle 40 on display 38 to facilitate system 16 being able to analyze, tag, modify, display, and curate a first image 52. When dealer 22 aims computing device 16 at vehicle 40, user interface 24 associated with system 10 displays target brackets 46 and level lines 48. Dealer 28 adjusts camera 36 of computing device 16 until object 32 appears on display 38 between the target brackets 46. Dealer 28 then adjusts camera 36 until level lines 48 are generally collinear with a centerline defined by vehicle 40 and captures the first image 52 of vehicle 40 showing the vehicle 40 from the first desired perspective. FIGS. 1, 3, and 5A-C. To capture a second image 54, dealer 28 moves to a second location automatically indicated by the user interface 24 to capture the second image 54 from the desired location, points camera 36 toward vehicle 40, and captures a second image 54 in a manner such as that described above. Dealer 28 repeats this process, capturing as many images, from as many angles, as automatically indicated by the user interface 24.

Figure 4:
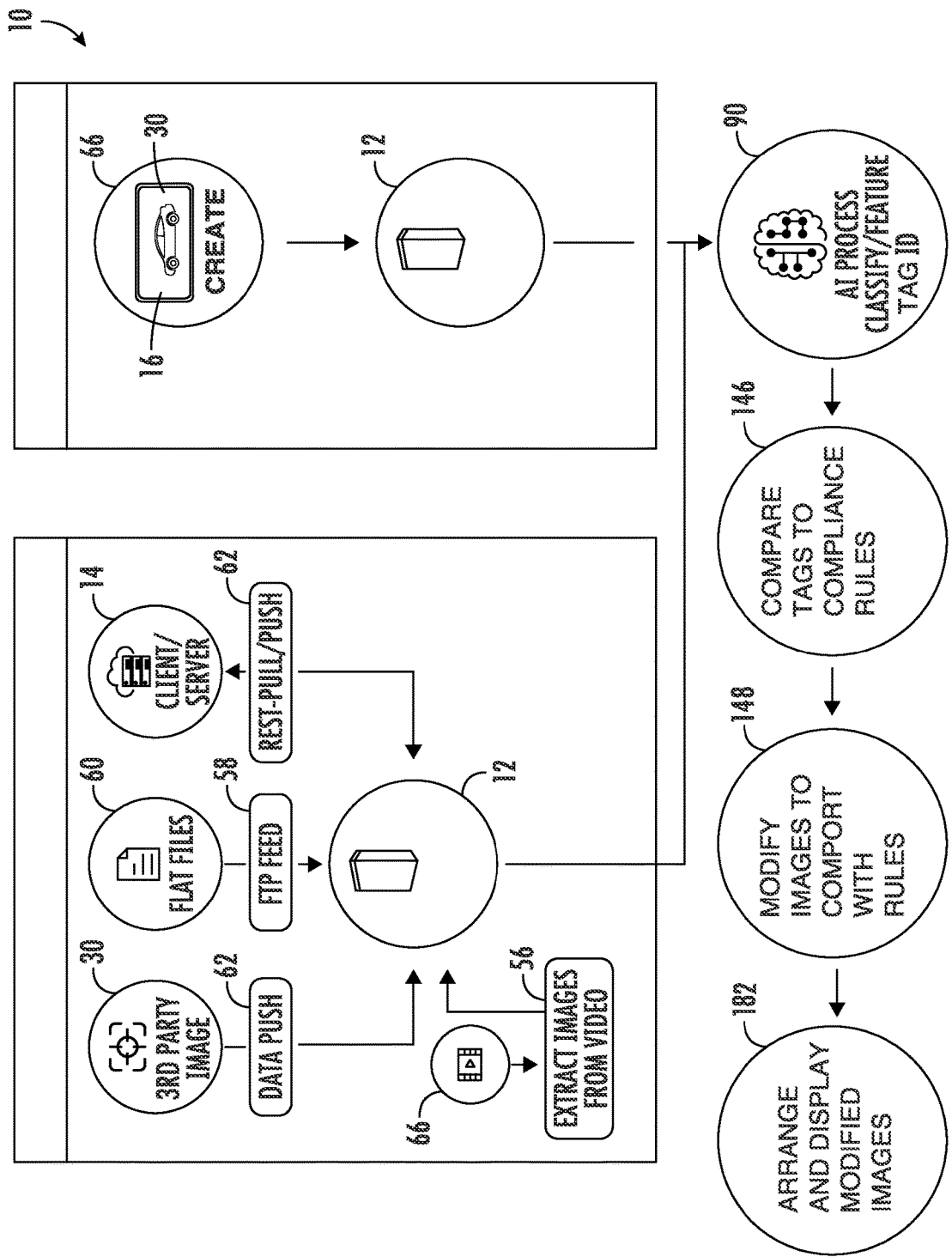
FIG. 4 is a flowchart illustrating example operations performed by an example computing system that is configured to convert captured images or and/videos into a display of images in accordance with predetermined compliance rules, in accordance with one or more aspects of the present disclosure.
Figure 5A:
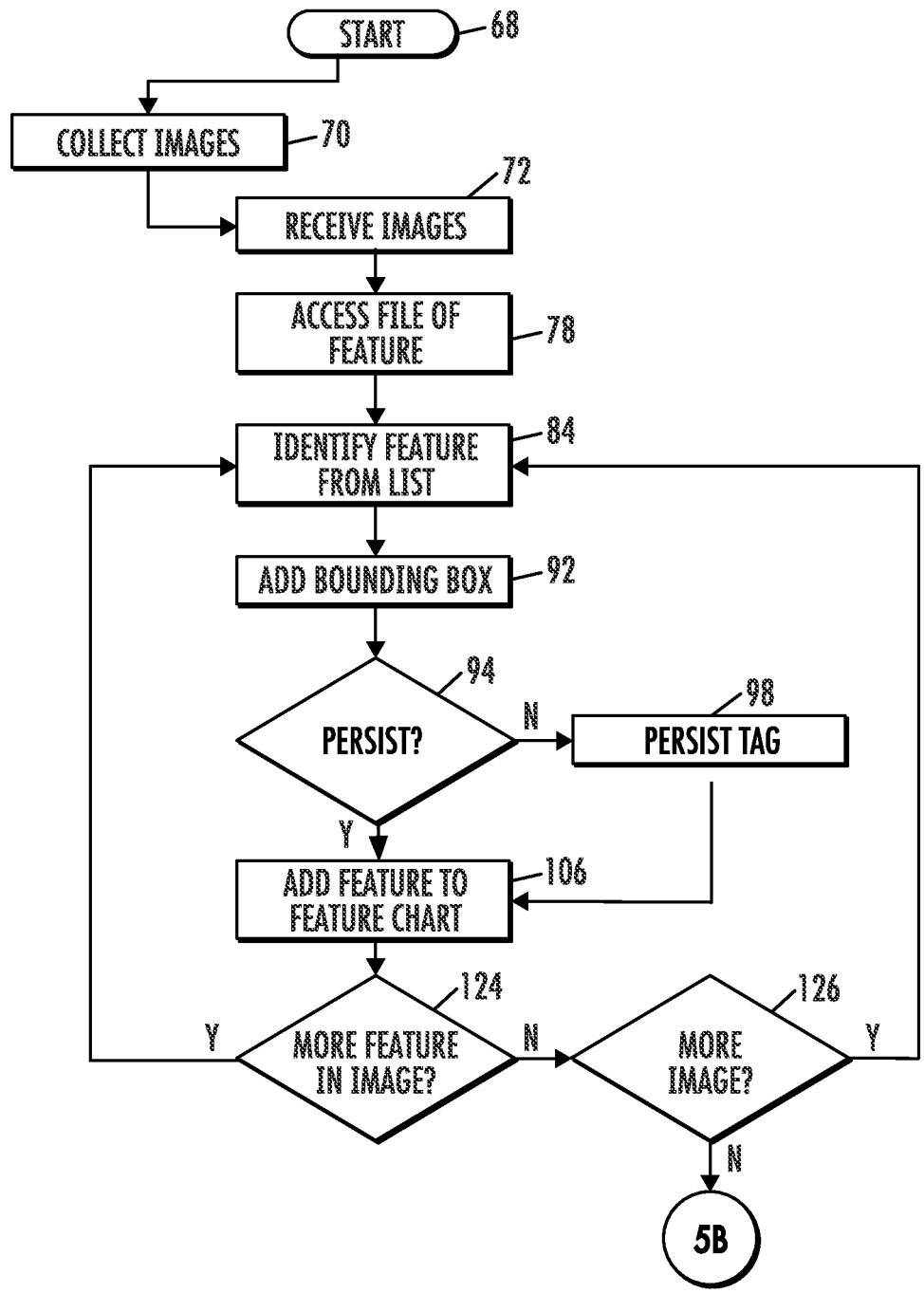
FIGS. 5A-5C is a flowchart illustrating example operations performed by an example computing device that is configured to tag images with features in the images and use the tags to implement rules modifying the images for display, in accordance with one or more aspects of the present disclosure
Figure 5B:
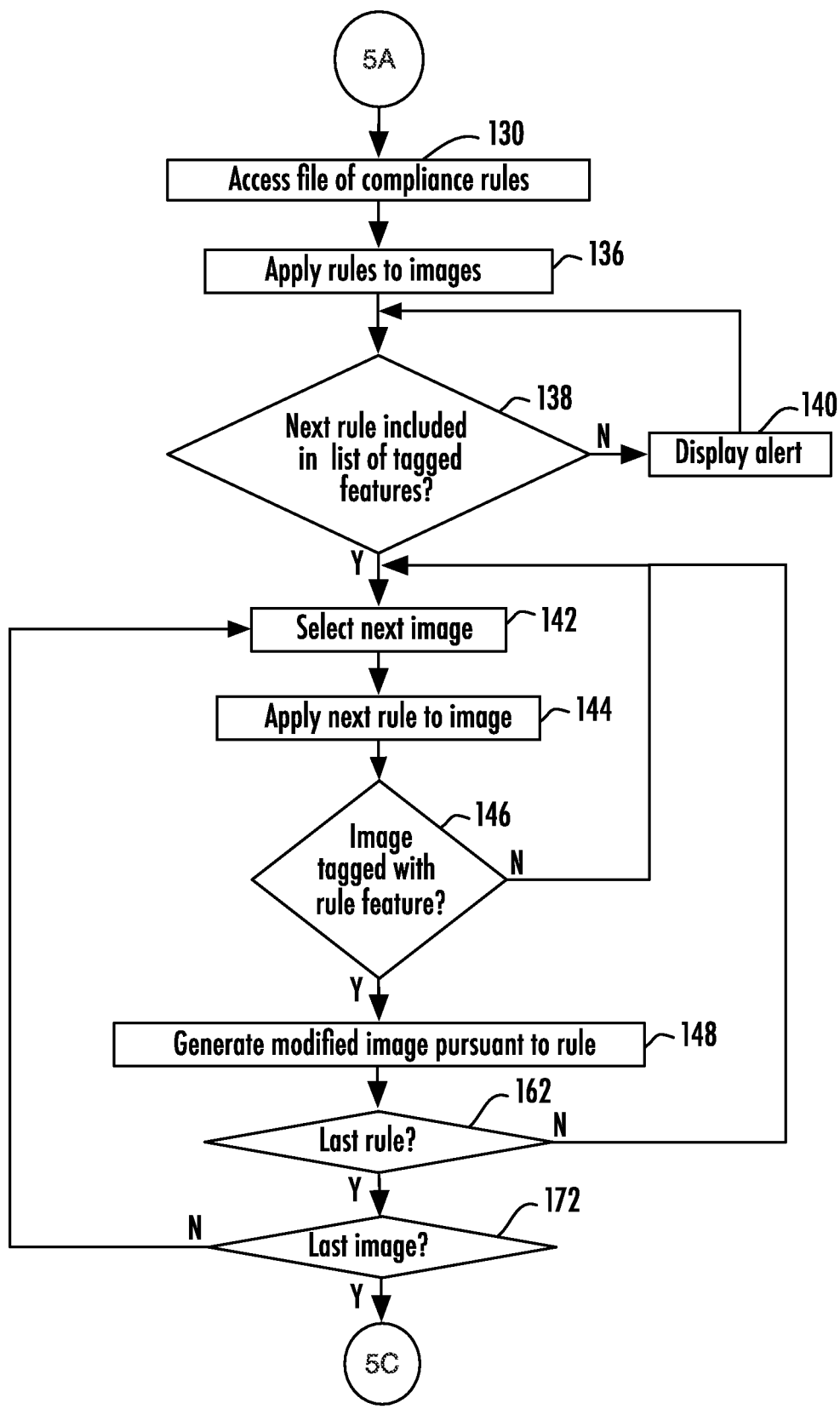
Figure 5C:
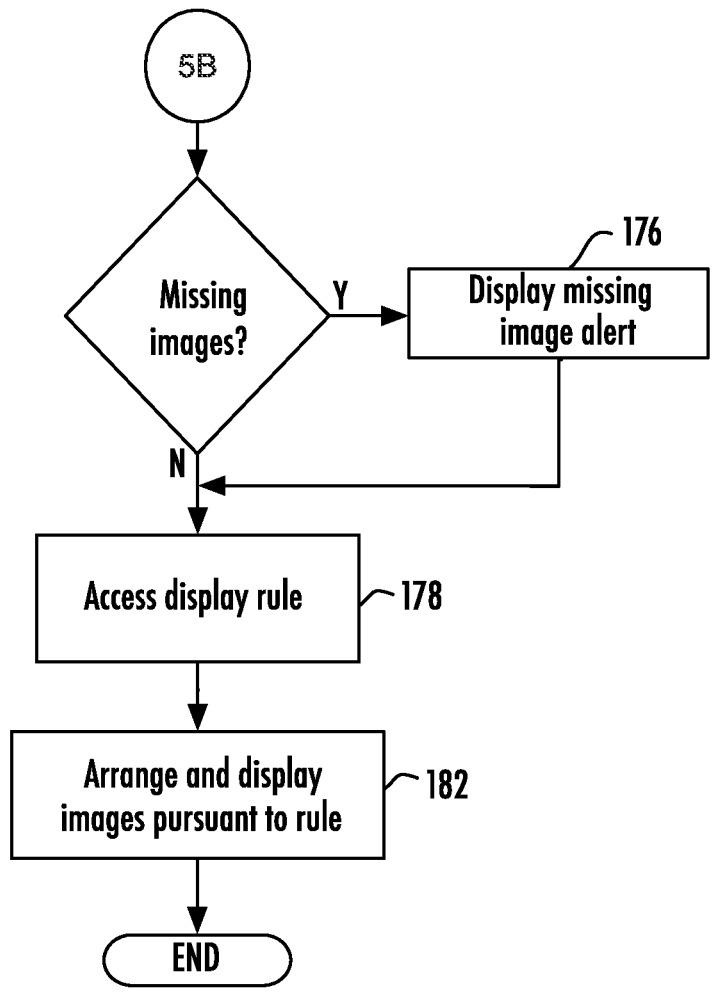

As shown in FIG. 4, once images 30 of object 32 have been captured, system 10 automatically transfers data from computing device 16 to be received by ISS 12. This data comprises at least one image from the plurality of images 30. Preferably system 10 automatically transfers supplemental data from computing device 16 to ISS 12 containing all of the remaining desired images 30. Alternatively, as shown in FIG. 4, dealer 28 may manually upload images 30 from computing device 16 to ISS 12. As another alternative, dealer 28 may upload images 30 from computing device 16 to DSS 14, which, in turn, uploads images 30 to ISS 12.

Instead of captured still images, images 30 may instead be still images automatically extracted 56 by system 10 from standard video files 57. ISS 12 may also receive data relating to images 30 via FTP feed 58 from a flat files database 60 or from DSS 14, using representational state transfer (REST) pull/push 62 or similar architecture. This additional data may relate to vehicle 40 shown in images 30, such as make, model, year, damage, or special features. As shown, the user 26 can create 66 an image 30 using a camera 36 as described above or using digital tools, either alone or in conjunction with the camera, such as artificial intelligence art tools, such as those known in the art, and upload the resulting image 30 to ISS 12.

As described more fully below, from the ISS 12, system 10 uses a machine feature identification module 74 employing machine learning artificial intelligence to automatically identify features 76 in images 30, and automatically tag 90 those images 30 with information associated with the features. System 10 also uses machine learning artificial intelligence to automatically determine 146 if the image 30 is tagged with a feature 76 associated with a predetermined compliance rule 134. If the image 30 is tagged with a feature 76 associated with a predetermined compliance rule 134, system 10 uses machine learning artificial intelligence to generate 148 a modified image 170 in accordance with the particular compliance rule 134 and arrange and display 182 the modified image 170 in accordance with a predetermined display rule.

As shown in FIG. 5, the process for examining, tagging, selecting, modifying, and posting images using system 10 is preferably completely automated, starting 68 with dealer 28 collecting 70 images 30, and ISS 12 receiving 72 those images 30. Upon receipt of images 30, system 10 uses machine feature identification module 74 to identify features 76 in images 30. Machine feature identification module 74 accesses 78 ISS 12 to retrieve a file 80 containing a predetermined list 82 of features 76 of vehicles 40 to be identified in images 30. In addition to list 82, ISS 12 may store numerous files 80 containing different predetermined lists 82 of features 76 to be identified in images 30 of various vehicles 40 and other objects 32 as desired.

Machine feature identification module 74 uses machine learning artificial intelligence and contextual image classification to identify patterns in first image 52 based on contextual information in image 52, such as the groupings of pixels surrounding a target pixel. Machine feature identification module 74 automatically compares contextual information derived from first image 52 against features 76 in list 82 to identify 84 targets 86 and create 90 metadata tags 92 that the system 14 associates with the first image 52.

For example, as shown in FIGS. 1, 5A-C, 6, and 7, machine feature identification module 74 receives 72 images 30 from dealer 28, accesses 78 a list 82 of features 76 from ISS 12, identifies 84 a target 86 in first image 52 as a feature 76 of vehicle 40 on list 80, such as a the image being the side view 90 of the vehicle 40, and adds creates 90 a metadata tag 92 indicating that the first image 52 shows a vehicle 40 in side view 40, and associates that side view metadata tag 92 with the first image 52. Once a feature 76 has been identified in the first image 52, machine feature identification module 74 determines 94 whether a persist has been performed on metadata tag 92, namely whether the system 10 has taken metadata tag 92 existence and added it to the context of first image 52, so that metadata tag 92 is managed viz. (future updates to metadata tag 92 will continue to be tracked). If a persist has not been performed on metadata tag 92, system 10 persists 98 metadata tag 92, storing the feature information in a database for later retrieval.

Figure 7:
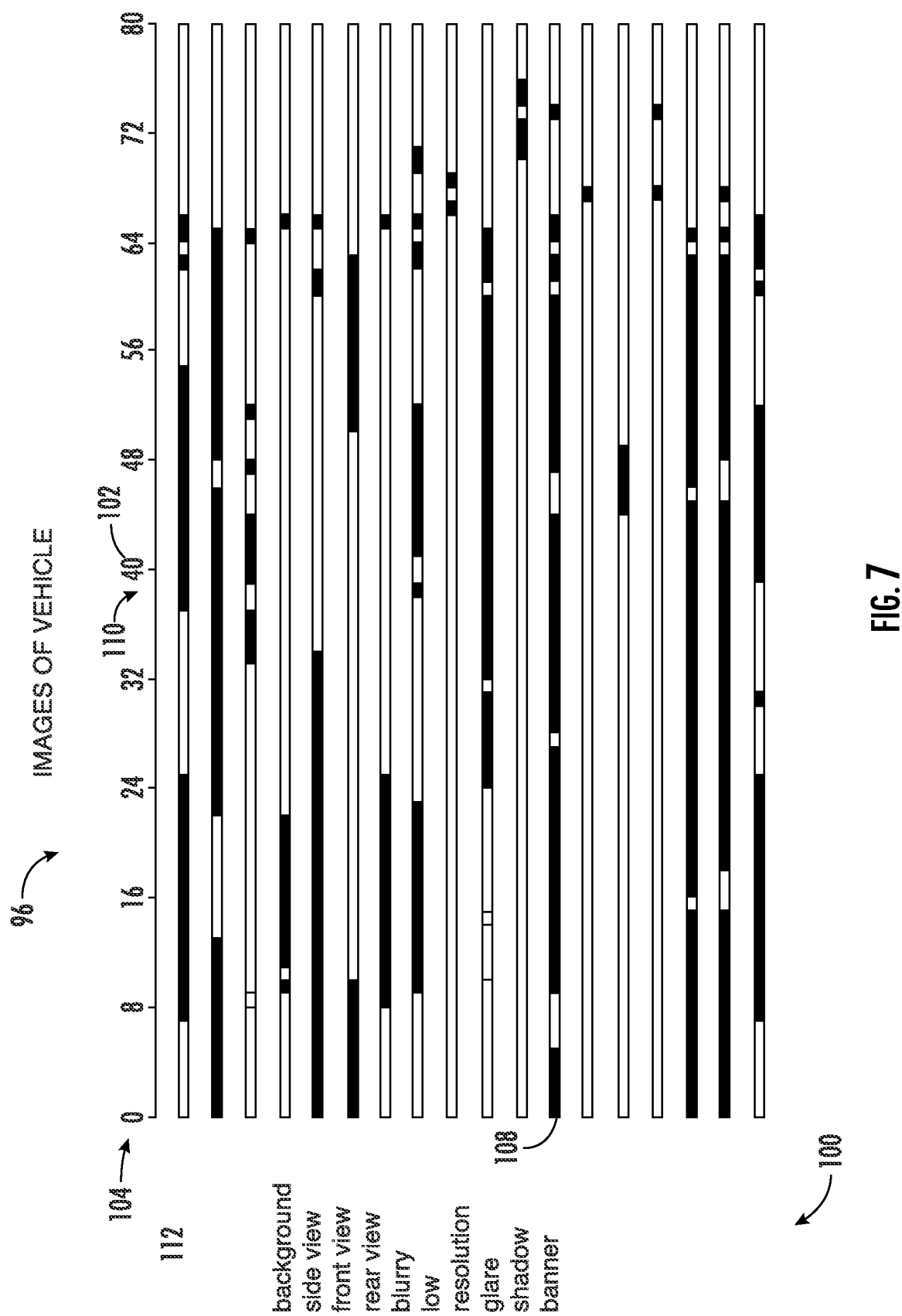
FIG. 7 is a feature chart identifying features identified in captured images by machine learning and artificial intelligence, in accordance with one or more aspects of the present disclosure.
Figure 8:
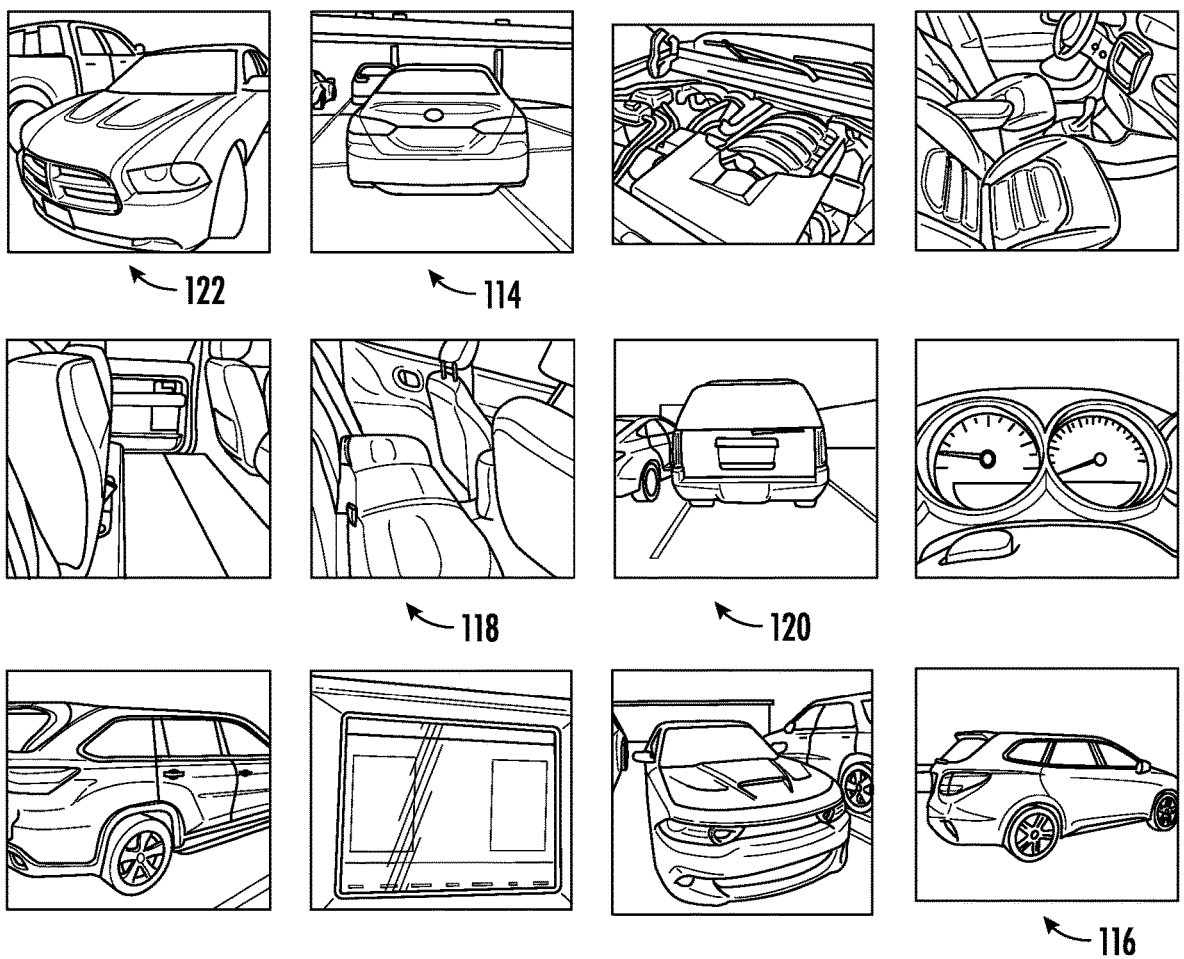
FIG. 8 is a set of images representing various features automatically identified and tagged by machine learning and artificial intelligence, in accordance with one or more aspects of the present disclosure.

As shown in FIG. 7, if desired, system 10 can generate and display a feature chart 96 listing features 76 machine feature identification module 74 finds in images 30, listing features 76 along a y-axis 100 and image numbers 102 along an x-axis 104. While unique number 110 is preferably a number identifying the sequential order in which the associated image 30 was captured, the unique number 110 may instead be randomly selected or otherwise assigned as desired. For example, as shown in FIGS. 6-8, if first image 52 is associated with a unique number (40), machine feature identification module 74 automatically identifies 84 features in the image 52 including background 114, side view 116, blurry 118, glare 120, and shadow 122 and darkens all portions of lines 108 in feature chart 96 corresponding to those features 76 under image number (40). FIG. 6 shows and example of a partial the list of features 76 in the preferred embodiment includes whether the image 30 includes a bad background, lack of detail, dirty engine bay, worn interior, folded seats, image blur, glare, warning lights, vehicle out of position, smudges, weather, fumes, etc. However, the features 76 may include anything in images 30 and/or any information associated with images 30.

After system 10 determines the metadata tag 92 has had a persist performed on it, machine feature identification module 74 determines 124 if there are any more unidentified features 76 in first image 52 and, if so, returns to step 84. System 10 continues until machine feature identification module 74 determines 124 there are no more unidentified features 76 in first image 52, at which point, module 74 determines 126 if there are any more images 30 that have not been analyzed and added to feature chart 96. For example, if machine feature identification module 74 determines 124 there are no more unidentified features 76 in first image 52, module 74 returns to step 84 and analyzes second image 54. System 10 continues in this manner until machine feature identification module 74 has identified and added all desired features 76 in all images 30 to feature chart 96, at which point the module 74 curates 128 the images, using metadata tags 90 to access 130 a list of compliance rules 134, such as partial list 132, and apply 136 them to images 30.

To apply 136 compliance rules 134 to images 30, system 10 accesses 130 a list 132 of compliance rules 134 from ISS 12 or any desired type of digital storage known in the art. FIGS. 1, 5A-C, and 9. List 132 of compliance rules 134 may be created by dealer 28 or a third-party. As shown in FIG. 9, list 132 includes those particular compliance rules 134, selected from list 82 of features 76 tagged by system 10, that dealer 28 desires system 10 to apply to images 30. In addition to list 132, ISS 12 may store numerous files containing different predetermined lists 132 of compliance rules 134 to apply to images 30 of various vehicles 40 as desired. List 132 may include compliance rules 134 not included in list 82 of features 76 tagged by system 10, in which case system 10 will determine 138 that feature 76 is not tagged and will display 140 a visual alert to dealer 28 that that particular compliance rule 134 could not be applied to images 30 as compliance rule 134 is not included within list 82 of features 76 tagged by system 10.

If system 10 determines 138 that feature 76 is tagged by system 10, system 10 selects 142 next image 30 for processing and automatically applies 144 that compliance rule 134 to image 30. If system 10 determines 146 that image 30 is not tagged with a feature 76 associated with a compliance rule 134, system 10 returns to step 144 to apply the next compliance rule 134 on list 132 to image 30. If, however, system 10 determines 146 that image 30 is tagged with a feature 76 associated with a compliance rule 134, system 10 automatically uses the tag associated with the feature to execute the rule to execute a predetermined action relating to the image, such as replacing the background on the image, and displaying at least an element of the image on a visually perceptive display, such as displaying the modified image on a webpage of a website displayed on a display, such as display 38. To accomplish this, system 10 automatically uses the tag associated with the feature to generate 148 a modified image in accordance with the particular compliance rule 134. Alternatively, system 10 may automatically use the tag associated with the feature to execute a rule selecting or eliminating a particular image based on the feature tagged in the image.

Figure 10:
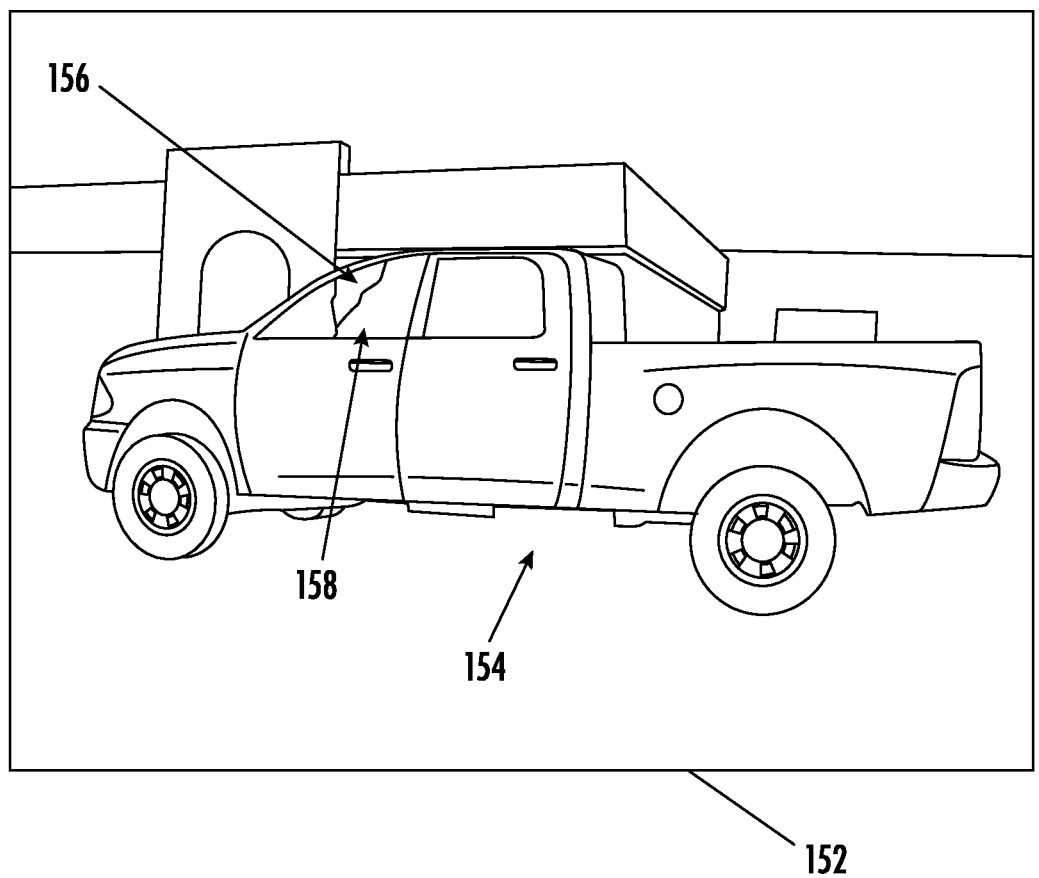
FIG. 10 is a captured and unaltered image of a vehicle showing glare on a window, in accordance with one or more aspects of the present disclosure.
Figure 11:
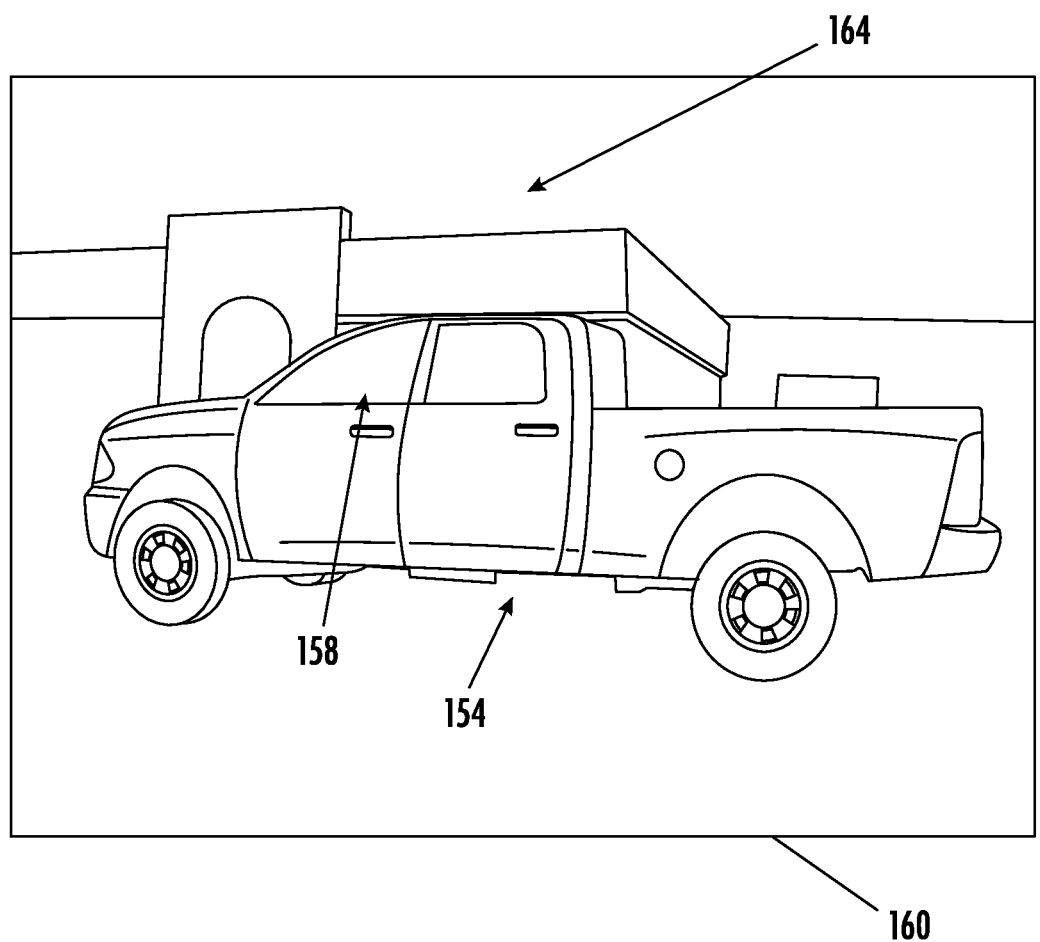
FIG. 11 is the captured image of FIG. 10, shown with the image automatically modified to remove the glare from the window, in accordance with one or more aspects of the present disclosure.
Figure 12:
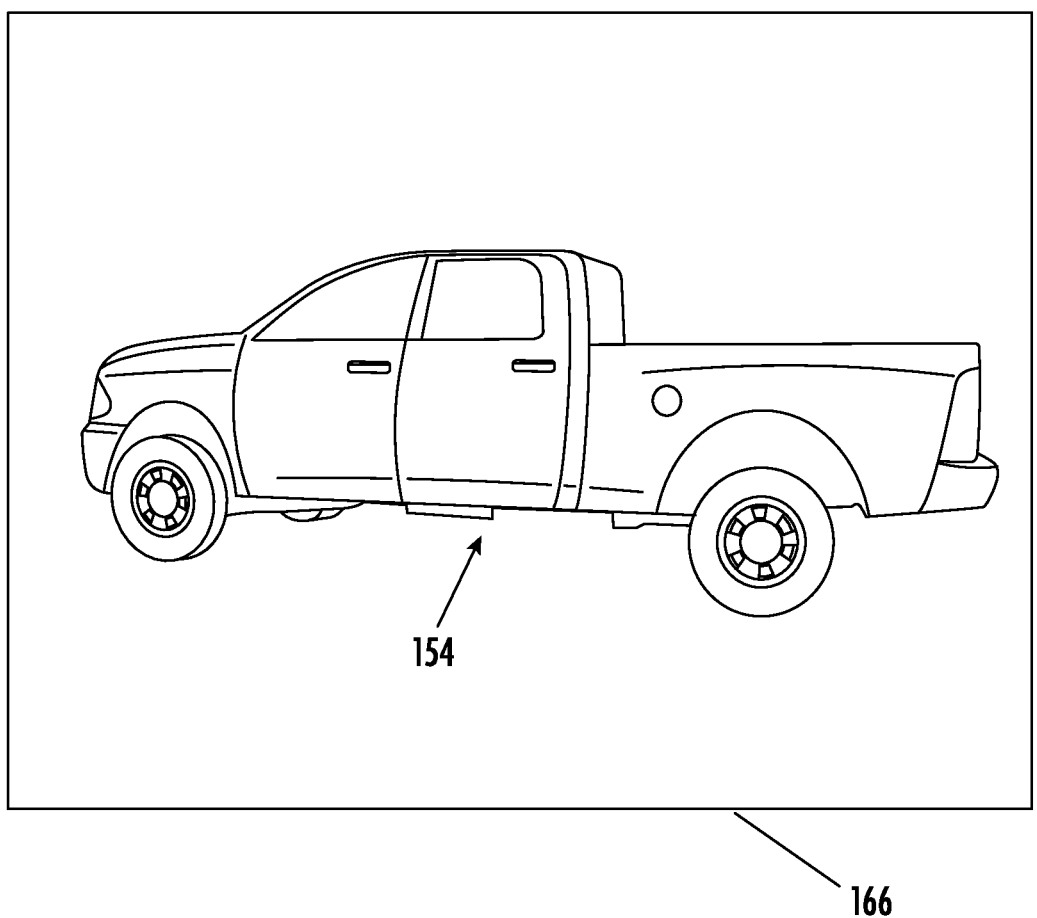
FIG. 12 is the captured image of FIG. 11, shown with the background removed by machine learning and artificial intelligence, in accordance with one or more aspects of the present disclosure.
Figure 13:
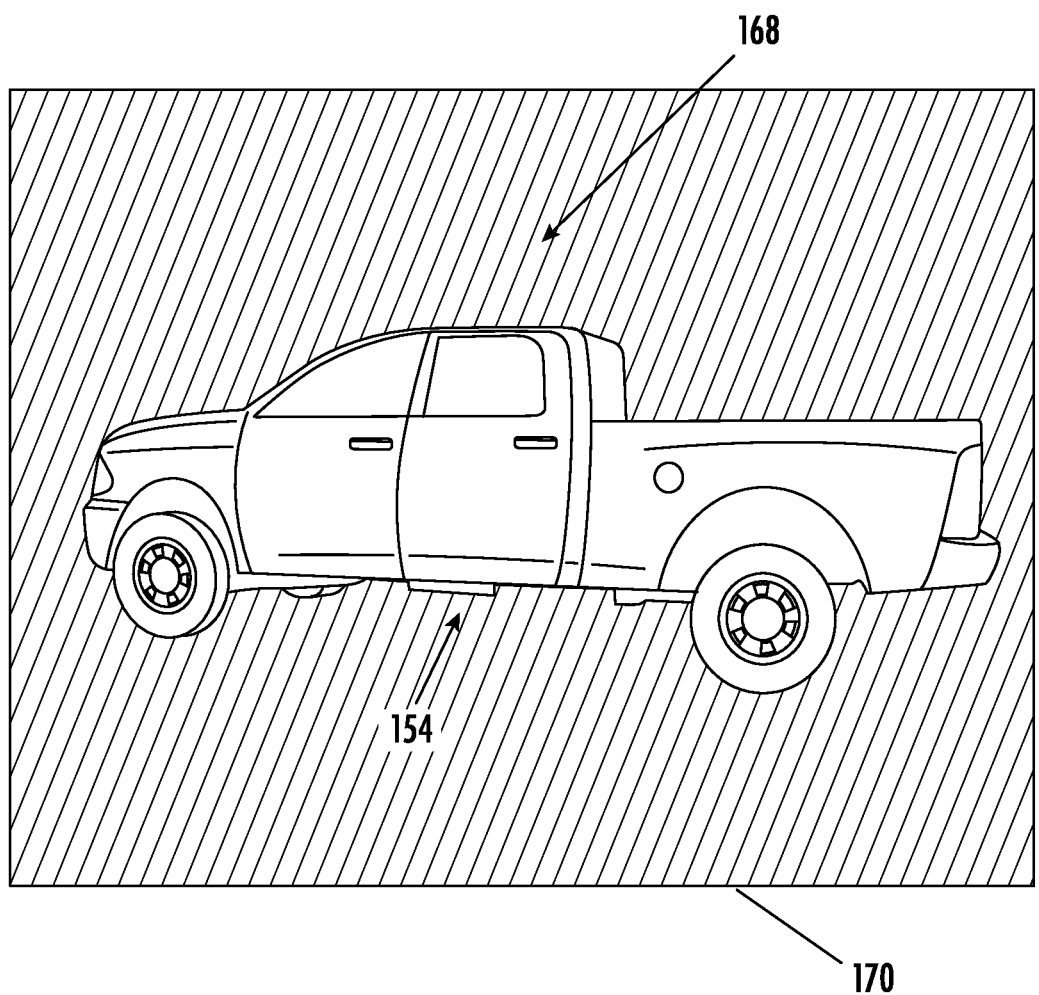
FIG. 13 is the captured image of FIG. 12, shown with the background replaced by machine learning and artificial intelligence with a colored background, in accordance with one or more aspects of the present disclosure.
Figure 14:
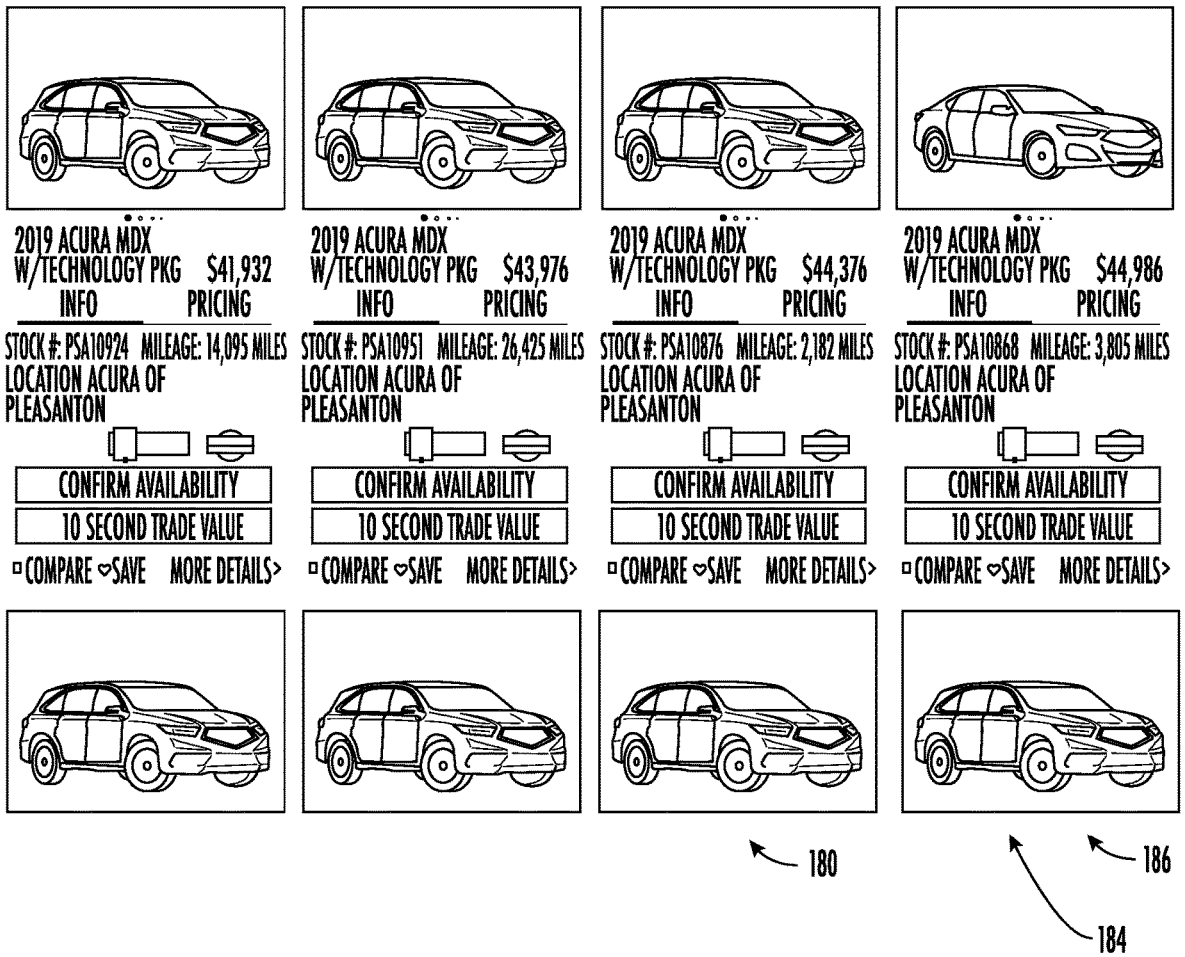
FIG. 14 is a display of webpage showing modified images sequenced and arranged, in accordance with one or more aspects of the present disclosure

In an exemplary embodiment, system 10 selects image 152 of a vehicle 154 with glare 156 on window 158. FIGS. 1, 5A-C, and 10-13. In a manner noted above, system 10 will have previously tagged image 152 with a "glare" tag, indicating where in image 152 glare 156 is located. FIGS. 10-12. System 10 determines 138 that feature 76 "glare" has already been tagged in image 152 and uses that tag to identify the location of glare 156 in image 152 and automatically applies 144 compliance rule 134 "remove glare" to image 152. System 10 removes glare 156 by implementing machine learning artificial intelligence, such as that known in the art, to manipulate image 152 to produce a modified image 160 of vehicle 154 with glare 156 on window 158 removed.

Once system 10 has generated modified image 160, system 10 determines 162 if the previously implemented compliance rule 134 was the last compliance rule 134. If system 10 determines 162 that the previously implemented compliance rule 134 was not the last compliance rule 134, system 10 applies 144 the next compliance rule 134 to modified image 160. The process continues in this manner until system 10 determines 162 the previously implemented compliance rule 134 was the last compliance rule 134.

In the above-identified exemplary embodiment, system 10 determines 162 that the "remove glare" compliance rule 134 was not the last compliance rule 134 and applies the next compliance rule 134 to modified image 160. As modified image 160 retains the previous tags associated with the features in original image 152, system 10 determines that the feature "background" has already been tagged in image 160 and uses that tag to identify the location of background 164 in image 160 and automatically applies 144 compliance rule 134 "segment background" to image 160. System 10 separates background 164 in image 160 from vehicle 154 in image 160 by using contextual image classification and machine learning to identify patterns in image 160 based on contextual information in image 160, such as the groupings of pixels surrounding a target pixel to differentiate vehicle 154 within image 160 from background 164. Once vehicle 154 and background 164 have been separated from one another, system 10 segments image 160 by identifying all background 164 in image 160 that is not vehicle 154, and removes background 164 from image 160, creating another image 166 displaying only vehicle 154. System 10 can also use segmentation to identify any blemishes or damage on vehicle 154, to which system 10 can automatically identify with tags and/or hotspots allowing anyone viewing image 160 to click on the hotspot and receive information about the blemish or damage. System 10 determines 162 that the "segment background" compliance rule 134 was not the last compliance rule 134 and, having determined that the feature "background" has already been tagged in image 164, again uses that tag to identify the location of background 164 in image 166 and automatically applies 144 compliance rule 134 "add blue background" to image 166. Just as system 10 segmented background 164 from image 160 above, system 10 adds a blue background 168 to image 166, creating another new image 170, and adding a tag to image 170 that image 170 has had background 164 removed and a blue background 168 added.

System 10 continues in this manner applying all of compliance rules 134 to image 170 until system 10 determines 162 the previously implemented compliance rule 134 was the last compliance rule 134. System 10 then determines 172 if current image 30 being modified is the last image 30 to be modified. If the current image 30 being modified is not the last image 30 to be modified system 10 selects 142 the next image 30 and repeats the foregoing process. If the current image 30 being modified is the last image 30 to be modified system 10 determines 174 if there are any missing images. For instance, if one of compliance rules 134 states that only images of "side perspective views" of vehicles 40 are to be used, and system 10 is unable to identify or generates a side perspective view from the images of a particular vehicle 40, system 10 displays 176 a visually identifiable alert. This alert may be of any manner known in the art.

If there are no missing images, system 10 accesses 178 display rules from ISS 12 or any desired type of digital storage known in the art. The display rules may be created by dealer 28 or a third-party. The display rules include instructions on how dealer 28 desires system 10 to display modified images 180. In addition to the display rules, ISS 12 may store numerous files containing different display rules to apply at different times, to different sets of images as desired. For example, a vehicle manufacturer may wish for all of their vehicles sold by dealer 28 to comport with particular compliance rules 134 and to be displayed in a certain manner that may be different from the preferred compliance rules and display parameters of another vehicle manufacturer or dealer 28. System 10 may even be designed to implement particular compliance rules and display parameters depending on particular customer requests or dynamic input received through dealer's website 184.

Once system 10 accesses 178 the display rules, system 10, arranges and displays 182 modified images 180 in accordance with those display rules. As shown in FIG. 17, the display rules may dictate that the modified images are to be automatically uploaded to dealer's website 184 in a 4×2 grid 186. Once system 10 displays modified images 180 in accordance with the display rules, the process is completed 188. System 10 may be implemented to provide audit reports listing the features identified in the images, modifications made to the images, missing images, as well as the manner in which modified images 180 were arranged, sequenced, and displayed. By using system 10 of the present invention, dealer 28 can ensure that all of the modified images 180 are in compliance with the rules and arranged in the predetermined arrangement. Alternatively, system 10 can use machine learning artificial intelligence, training on vehicles that have sold through website 184, to modify the compliance rules and display and arrangement parameters to generate and display images in manner designed to increase sales of vehicles shown in the images.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. For example, the system described herein is not limited to vehicles, but may be used with any images of any subjects that a user 26 wishes to automatically modify and display.

What is claimed is:

1. At least one non-transitory computer-readable storage medium having computer-executable instructions stored thereon which, when executed by a computer, causes the computer to perform a method comprising:
   providing a first predetermined set of visual display rules associating a first predetermined set of actions with a first type vehicle, the first predetermined set of rules comprising:
      a first rule of visually-perceptible image display associated with a first visually-perceptible feature; and
      second rule of visually-perceptible image display associated with a second visually-perceptible feature;
   providing a second predetermined set of visual display rules associating a second predetermined set of actions with a second type vehicle, the second predetermined set of rules comprising:
      a third rule of visually-perceptible image display associated with a third visually-perceptible feature; and
      a fourth rule of visually-perceptible image display associated with a fourth visually-perceptible feature;
   providing a first master set of rules comprising rules from the first predetermined set of rules and rules from the second predetermined set of rules;
   capturing a first image of a first vehicle of the first type vehicle from a first perspective wherein the first image is not in compliance with the first predetermined set of visual display rules;
   capturing a second image of the first vehicle from a second perspective wherein the second image is not in compliance with the first predetermined set of visual display rules;
   capturing a third image of a second vehicle of the second type vehicle from a third perspective wherein the third image is not in compliance with the second predetermined set of visual display rules;
   capturing a fourth image of the second vehicle from a fourth perspective wherein the fourth image is not in compliance with the second predetermined set of visual display rules;
   automatically using machine learning and contextual image classification to identify a first portion of contextual information associated with a first target pixel based on patterns in the first image using groupings of pixels surrounding the first target pixel in the first image;
   automatically using machine learning to compare the first portion of contextual information against the master set of rules to identify a first visually-perceptible feature in the first image associated with the master set of rules, generating a first metadata tag based on the first visually-perceptible feature, and associating the first metadata tag with the first image;
   automatically using the first metadata tag to execute the first rule and add a first visually-perceptible display element to the first image;
   automatically using machine learning and contextual image classification to identify a second portion of contextual information associated with a second target pixel based on patterns in the second image using groupings of pixels surrounding the second target pixel in the second image;
   automatically using machine learning to compare the second portion of contextual information against the master set of rules to identify a second visually-perceptible feature in the second image associated the master set of rules, generating a second metadata tag based on the second visually-perceptible feature, and associating the second metadata tag with the second image;
   automatically using the second metadata tag to execute the second rule and add a second visually-perceptible display element to the second image;
   automatically using machine learning and contextual image classification to identify a third portion of contextual information associated with a third target pixel based on patterns in the third image using groupings of pixels surrounding the third target pixel in the third image;
   automatically using machine learning to compare the third portion of contextual information against the master set of rules to identify a third visually-perceptible feature in the third image associated the master set of rules, generating a third metadata tag based on the third visually-perceptible feature, and associating the third metadata tag with the third image;
   automatically using the third metadata tag to execute the third rule and add a third visually-perceptible display element to the third image;
   automatically using machine learning and contextual image classification to identify a fourth portion of contextual information associated with a fourth target pixel based on patterns in the fourth image using groupings of pixels surrounding the fourth target pixel in the fourth image;
   automatically using machine learning to compare the fourth portion of contextual information against the master set of rules to identify a fourth visually-perceptible feature in the fourth image associated the master set of rules, generating a fourth metadata tag based on the fourth visually-perceptible feature, and associating the fourth metadata tag with the fourth image;
   automatically using the fourth metadata tag to execute the fourth rule and add a fourth visually-perceptible display element to the fourth image;
   automatically displaying the first image with the first visually-perceptible display element in compliance with the first predetermined set of visual display rules;
   automatically displaying the second image with the second visually-perceptible display element in compliance with the first predetermined set of visual display rules;
   automatically displaying the third image with the third visually-perceptible display element in compliance with the second predetermined set of visual display rules; and
   automatically displaying the fourth image with the fourth visually-perceptible display element in compliance with the second predetermined set of visual display rules.

2. The at least one non-transitory computer-readable storage medium of claim 1, wherein the first type vehicle is a vehicle manufactured by a first manufacturer and wherein the second type vehicle is a vehicle manufactured by a second vehicle manufacturer.

3. The at least one non-transitory computer-readable storage medium of claim 2, wherein the first predetermined set of rules is a first predetermined set of rules received from the first vehicle manufacturer and wherein the second predetermined set of rules is a second predetermined set of rules received from the second vehicle manufacturer.

4. The at least one non-transitory computer-readable storage medium of claim 1, wherein automatically identifying a vehicle type of the first image as the first type comprises identifying a plurality of features of the first vehicle in the first image and using the plurality of features to identify the vehicle type of the first image as the first type using machine learning.

5. The at least one non-transitory computer-readable storage medium of claim 1, wherein the first predetermined set of rules is provided by a first manufacturer of the first vehicle type and wherein the second predetermined set of rules is provided by a second manufacturer of the second vehicle type.

6. The at least one non-transitory computer-readable storage medium of claim 5, wherein the first predetermined set of rules are first marketing display compliance standards of the first manufacturer and wherein the second predetermined set of rules are second marketing display compliance standards of the second manufacturer.

7. The at least one non-transitory computer-readable storage medium of claim 1, further comprising automatically using the third visually-perceptible feature to prevent application of any of the second predetermined set of rules to the third image that are not also in the first predetermined set of rules.

8. The at least one non-transitory computer-readable storage medium of claim 1, wherein the first visually-perceptible feature is a damage location on a vehicle.

9. The at least one non-transitory computer-readable storage medium of claim 8, further comprising automatically adding an interactive hotspot to the image at the damage location.

10. The at least one non-transitory computer-readable storage medium of claim 1, wherein the first visually-perceptible feature is a feature selected from the group consisting of a vehicle make, a vehicle model, a vehicle angle, a vehicle year, a vehicle trim, an image perspective, a banner, text, a cropping, a background segmentation, a level of image detail, a shadow, a glare, a reflection, a license plate number, a person, an animal, a tree, a lack of focus, rain, fumes, snow, dust, smoke, mud, a banner, and an overlay.

11. The at least one non-transitory computer-readable storage medium of claim 10, further comprising automatically adding an interactive hotspot to the first image at the feature location.

12. The at least one non-transitory computer-readable storage medium of claim 11, further comprising automatically using machine learning and contextual image classification to identify a fifth portion of contextual information associated with the first image using the first visually-perceptible feature.

13. The at least one non-transitory computer-readable storage medium of claim 11, further comprising automatically using machine learning and contextual image classification to identify a fifth portion of contextual information associated with the first image using automatic segmentation of the image.

* * * * *